Figure 10:
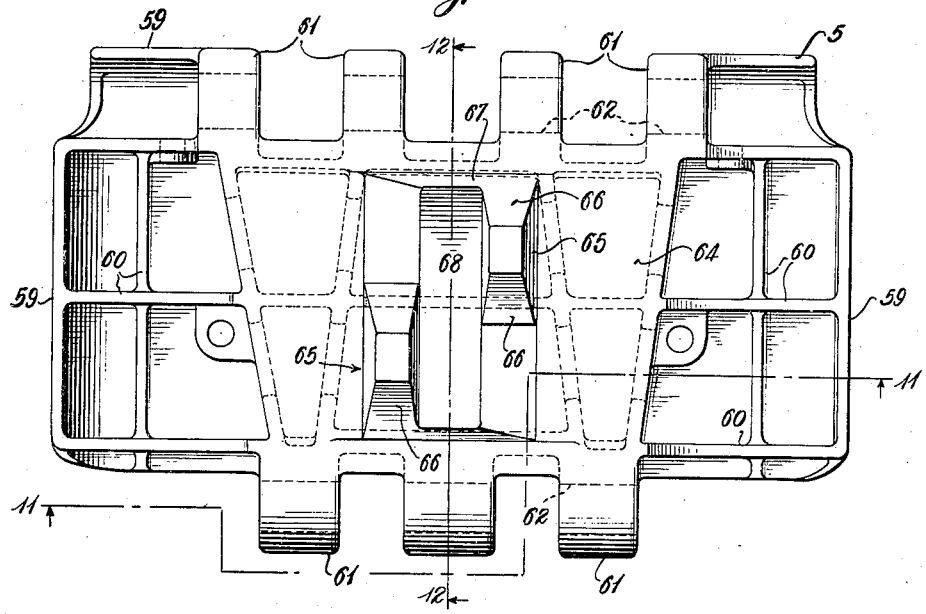

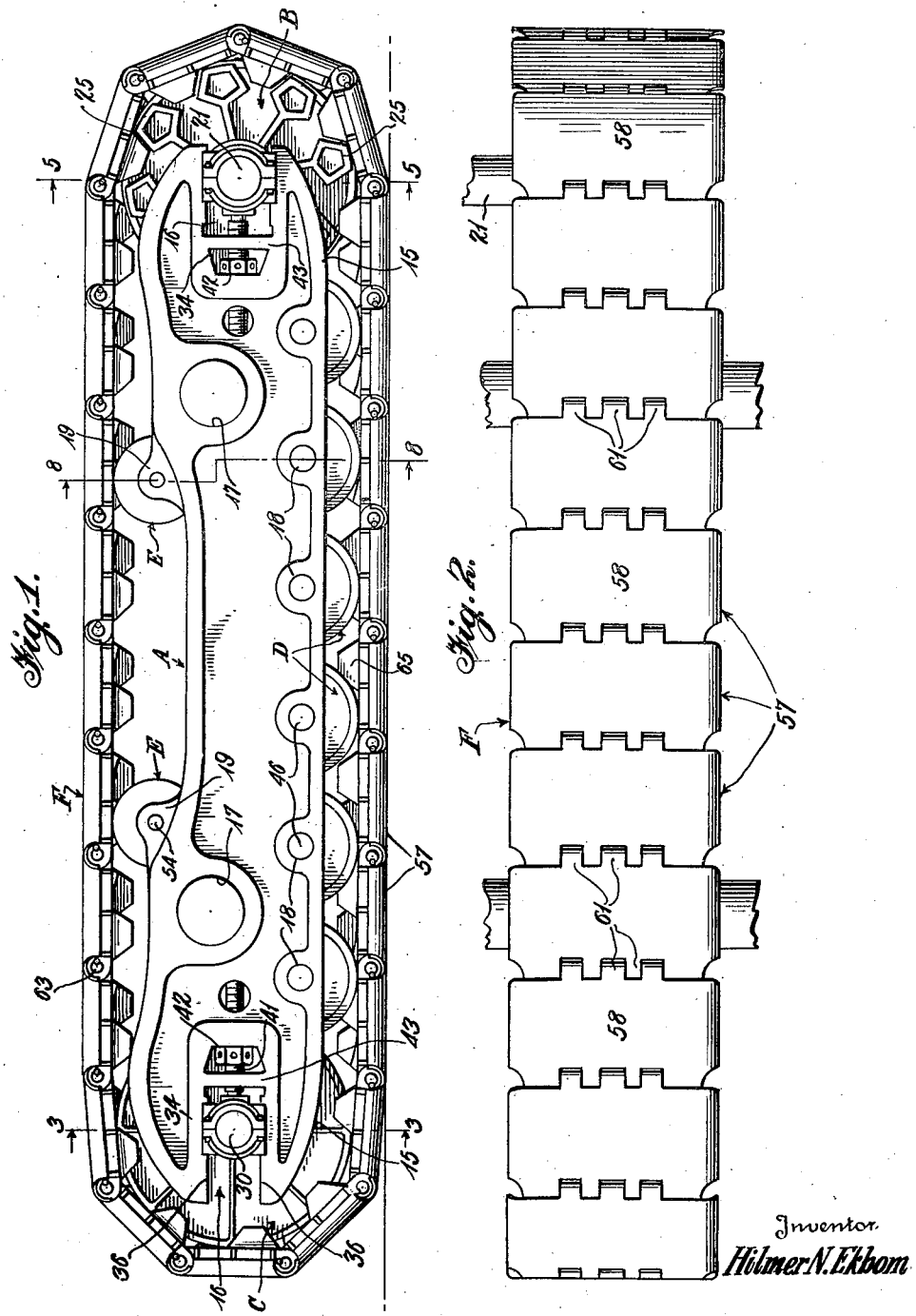

July 25, 1939.  H. N. EKBOM  2,167,039
TRACTION DEVICE
Filed Feb. 7, 1938  5 Sheets-Sheet 2
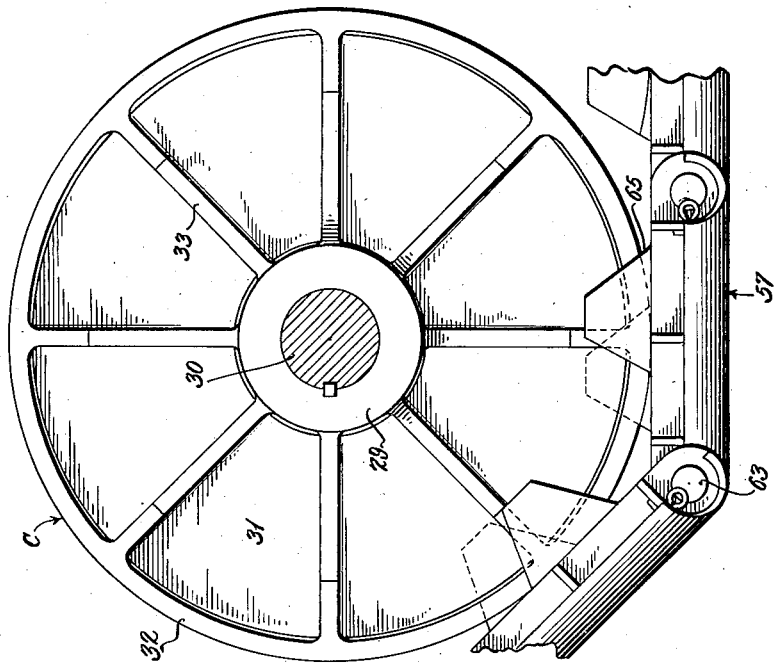
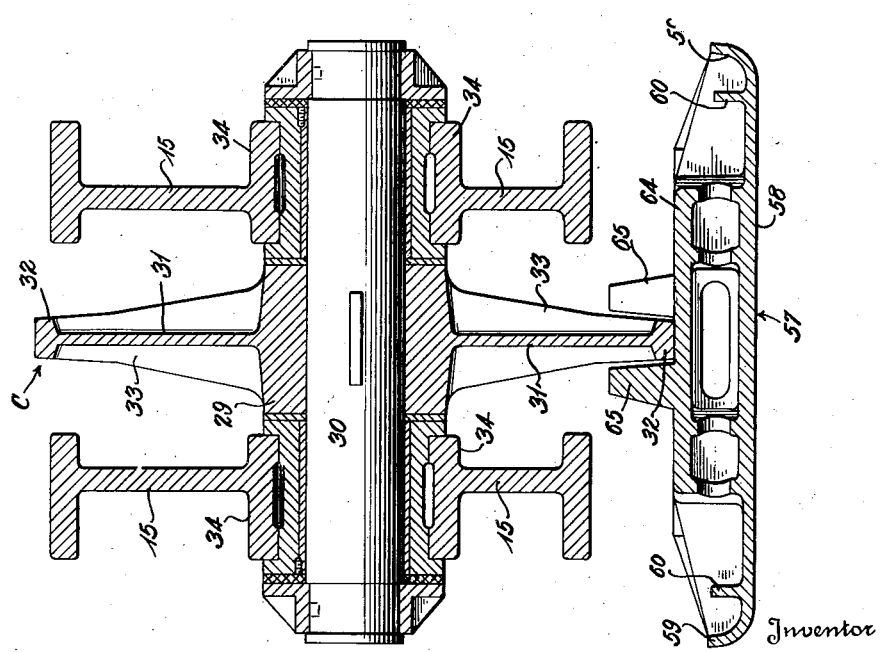
Inventor
*Hilmer N. Ekbom*
By L. Donald Myers
Attorney July 25, 1939. H. N. EKBOM 2,167,039
TRACTION DEVICE
Filed Feb. 7, 1938  5 Sheets-Sheet 3
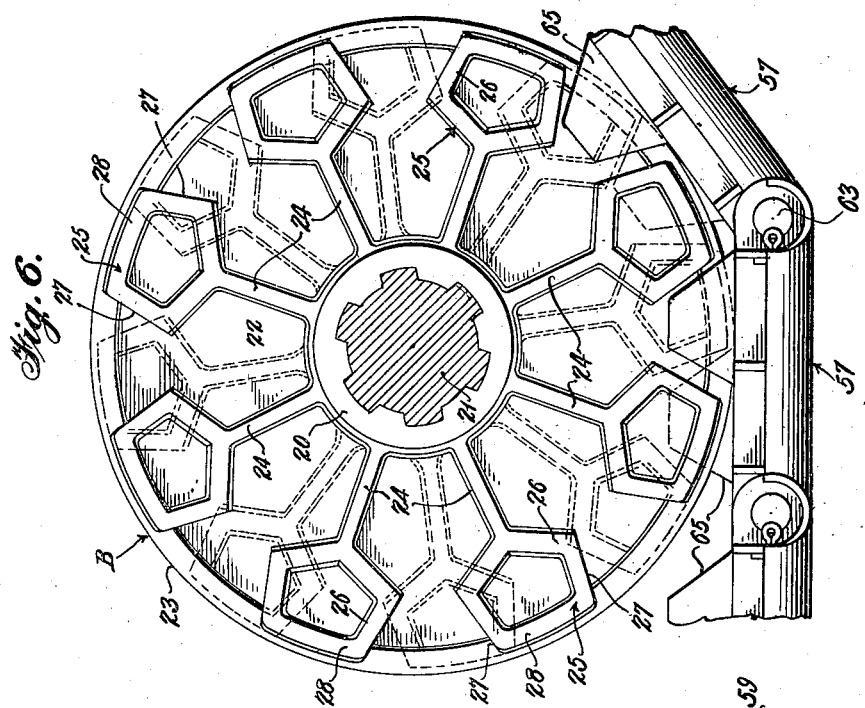
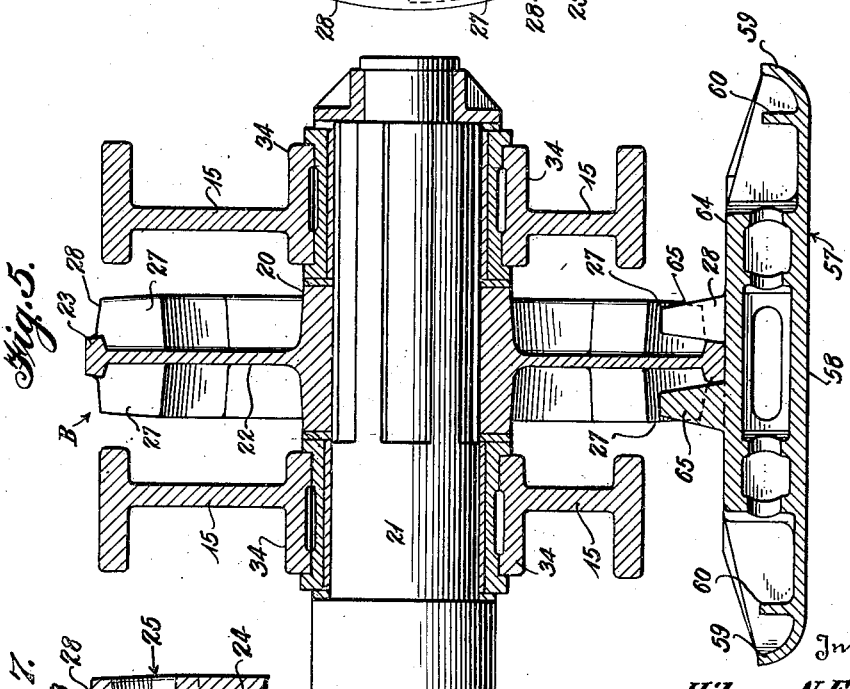
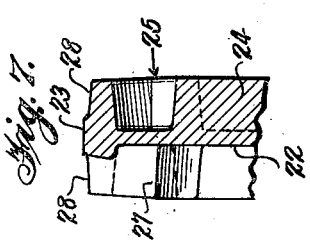
Inventor
Hilmer N. Ekbom July 25, 1939.  H. N. EKBOM  2,167,039
TRACTION DEVICE
Filed Feb. 7, 1938  5 Sheets-Sheet 4
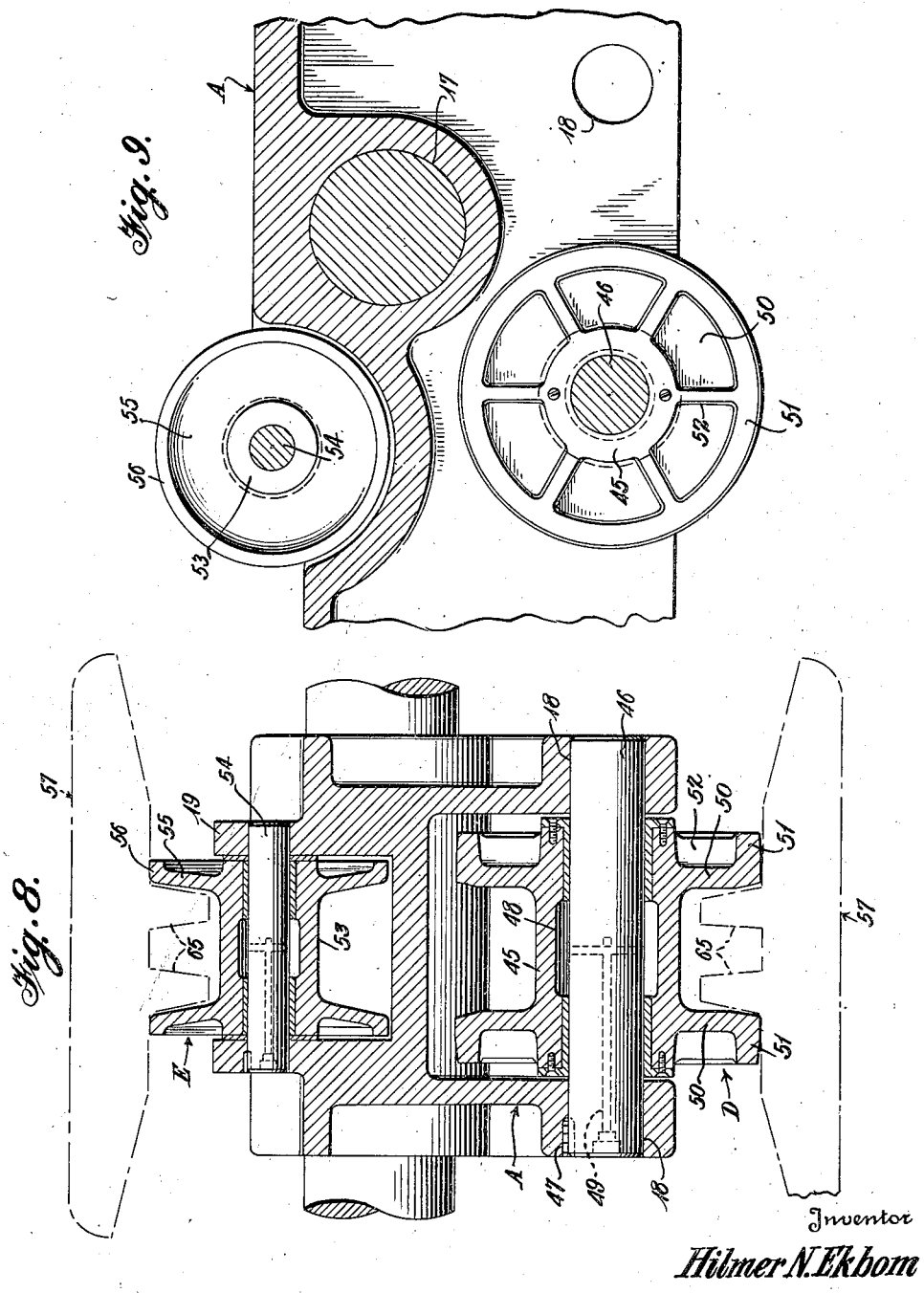
Inventor
Hilmer N. Ekbom
By L. Donald Myers
Attorney July 25, 1939.          H. N. EKBOM                    2,167,039
                       TRACTION DEVICE
                     Filed Feb. 7, 1938          5 Sheets-Sheet 5

Inventor
Hilmer N. Ekbom
By L. Donald Myers
Attorney

Patented July 25, 1939

2,167,039

UNITED STATES PATENT OFFICE 2,167,039

TRACTION DEVICE

Hilmer N. Ekbom, Chicago, Ill., assignor to Link-Belt Company, a corporation of Illinois Application February 7, 1938, Serial No. 189,204

7 Claims. (Cl. 305—9)

This invention relates to new and useful improvements in traction devices of the traveling tread or crawler type.

Earth working machines, vehicles and the like which employ traction devices or wheel substitutes of the crawler or traveling tread type are usually steered by differentially driving the traction devices on opposite sides of the machine or by driving one of said devices and braking or drifting the other. In either case, the traction shoes are caused to slide sideways which has a tendency to cause the traveling tread to slide off of the drive and take-up wheels and the carrier rollers and to scoop up dirt and rocks onto the back of the shoes. It is necessary, therefore, to construct the traction shoes, the sprocket and take-up wheels and the carrier rollers to properly resist these lateral strains. It also is important to construct the wheels and shoes so as to avoid pockets or angles where dirt will accumulate and where rocks, or other hard objects, may become wedged as such dirt and objects have a tendency to cause the traveling tread to become misaligned with the drive and take-up wheels and to impose upon these members undue strains.

It is the primary object of this invention to provide a traction device of the above mentioned type in which each individual shoe and the several wheels and rollers are so constructed and arranged relative to each other as to resist lateral strains in both directions.

A further important object of the invention is to so construct the wheels and shoes as to avoid dirt and rocks from accumulating in relatively meshing portions of the same.

Another object of the invention is to provide a shoe and drive sprocket combination in which the drive tooth load is applied centrally to each shoe.

A further object of the invention is to provide drive and take-up wheels which are of extremely simple design and particularly easy to cast because of the absence of any enclosed or complicated pockets requiring difficult core work.

Other objects and advantages of the invention will be apparent during the course of the following description.

Figure 11:
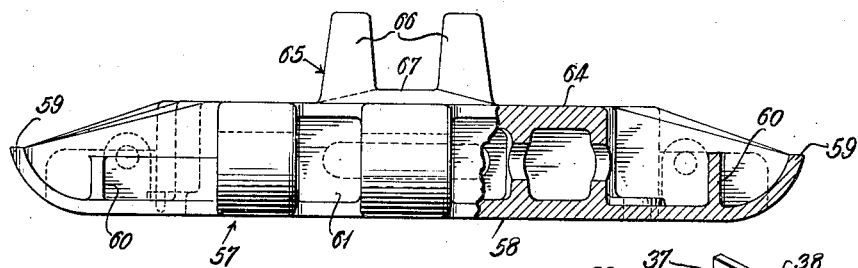
Figure 12:
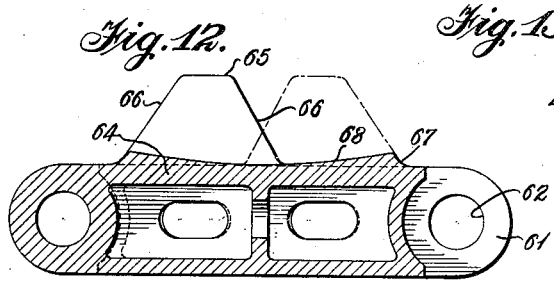
Figure 13:
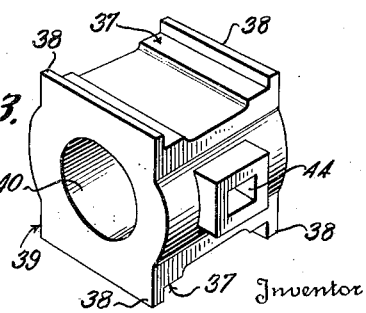

In the accompanying drawings forming a part of this specification and in which like numerals are employed to designate like parts throughout the same, Figure 1 is a side elevational view of the traction device or unit embodying this invention, Figure 2 is a top plan view of the unit disclosed in Fig. 1, Figure 3 is a vertical sectional view taken through the take-up wheel, its mount on the frame of the unit and its association with a tread or traction shoe, as on line 3—3 of Fig. 1, Figure 4 is a side elevational view of the take-up wheel illustrated in Fig. 3 and showing tread or traction shoes in dash lines meshing therewith, Figure 5 is a vertical sectional view taken on line 5—5 of Fig. 1 and illustrates the traction or drive sprocket wheel, its mounting on the frame of the unit and its association with a tread or traction shoe, Figure 6 is a side elevational view of the drive sprocket wheel disclosed in Fig. 5, Figure 7 is a detail radial sectional view taken through one of the tooth formations of the drive sprocket disclosed in Figs. 5 and 6, Figure 8 is a vertical sectional view taken on line 8—8 of Fig. 1 and illustrates the upper and lower carrier rollers and their association with the endless tread shoe units, Figure 9 is a detail sectional view and partial side elevational view of the portion of the unit disclosed in Fig. 8, Figure 10 is a detail plan view of the back or inside face of one of the tread or traction shoes, Figure 11 is a partial sectional view and partial edge elevational view taken on lines 11—11 of Fig. 10, Figure 12 is a vertical sectional view of the shoe disclosed in Fig. 10 and taken on line 12—12 of this figure, and Figure 13 is a detail perspective view of one of the adjustable take-up bearings employed for mounting the shafts of the drive and take-up wheels.

In the drawings, wherein for the purpose of illustration is shown the preferred embodiment of this invention, and particularly referring to Fig. 1, there is disclosed in side elevation a complete traction device or unit of the type embodying this invention. This unit consists of a main frame which is designated in its entirety by the reference character A. At one end of this frame, there is mounted an adjustable drive sprocket wheel B. A take-up wheel C is adjustably mounted at the opposite end of the frame A. The bottom portion of the frame has rotatably mounted thereon a suitable number of carrier rollers D. The upper portion of the frame A also carries a suitable number of carrier rollers E. A traveling tread or track of the endless type is illustrated as being trained around the frame A and the drive sprocket wheel and take-up wheel B and C. This endless traveling tread or track is designated in its entirety by the reference character F. The upper and lower carrier rollers are illustrated in this figure as being properly associated with the traveling tread or track F.

The main frame A may be of any desired construction but it is preferred to cast the same to provide an elongated body which is formed at each of its ends with the four spaced arms 15, see Figs. 3 and 5, as well as Fig. 1. These arms are arranged in parallel, vertical pairs. The arms of each vertical pair are spaced to provide openings 16 to slidably receive the adjustable bearings for the shafts of the drive and take-up wheels B and C. The manner of associating these adjustable or take-up bearings for the shafts will be described more in detail at a later point.

The frame A is further illustrated in Fig. 1 as being formed with reinforced openings 17 to receive axles, or the like, by means of which the traction device or unit is connected to the machine or vehicle. The bottom edge portion of the frame A, furthermore, is provided with reinforced bearing openings 18 to receive the shafts of the lower carrier rollers D. The upper carrier rollers E are mounted with their shafts received in bearing openings formed in the ears 19.

The drive sprocket wheel B is best disclosed in detail in Figs. 5, 6 and 7. This sprocket wheel includes a hub 20 which is splined to the drive shaft 21 in a conventional manner. The main body of the sprocket wheel consists of a solid web 22 of disc formation which has an enlarged, continuous rim 23 formed on its periphery. Each face of the web 22 has formed thereon a circular series of radially projecting ribs 24. These ribs 24 do not extend outwardly to the rim 23 but merge into the tooth members 25. These tooth members are of hollow formation and include the side portions 26 which have radially converging working faces 27. The outer sides of these hollow teeth, designated by the reference character 28, extend circumferentially of the wheel rim 23 but are positioned radially inwardly of the peripheral surface of said rim, as clearly illustrated in Figs. 5 and 7.

By carefully inspecting Fig. 6, it will be seen that the tooth members 25 and their associated ribs 24, positioned on one side of the central web 22, are positioned circumferentially in advance of the teeth and ribs formed on the opposite side or face of the wheel web. In other words, the teeth on opposite sides of the central web 22 are staggered or offset with respect to each other.

It will be appreciated that this type of drive sprocket wheel may be very easily cast as it presents no complicated pockets requiring difficult core work. This sprocket wheel formation, also, prevents the accumulation of dirt in any of the meshing portions of the same.

The take-up wheel C is disclosed in detail in Figs. 3 and 4. This wheel includes a hub portion 29 which is suitably keyed to a stub-shaft 30. Radiating from the central portion of the hub is a disc-like, solid web 31 which terminates at its periphery in an enlarged rim portion 32. Radially extending from the hub 29 to the rim 32 are the reinforcing ribs 33. This take-up wheel construction, also, is of exceedingly simple construction and provides no dirt accumulating pockets or angles. The design of this wheel provides an exceedingly simple casting problem for the wheel contains no enclosed or complicated pockets requiring difficult core work.

The drive shaft 21 for the drive sprocket wheel B and the stub shaft 30 for the take-up wheel C are adjustably mounted in the spaces 16, at the opposite ends of the frame A, in the same manner and by the same mechanism. It is believed, therefore, that a single description of this type of adjustable mount will be sufficient for both wheels.

By inspecting Figs. 1, 3 and 5, it will be seen that each one of the arms 15 is provided with a flanged inner edge 34. Fig. 1 discloses each one of these flanges 34 as having formed thereon a straight slide-way 36. Each one of these slideways is to be received within the space 37 formed between the flanges 38 of a take-up bearing of the type disclosed in detail in Fig. 13. It is to be understood that two of these bearings 39 are to be provided for each one of the shafts 21 and 30. The shafts are received within the bearing apertures 40 of these take-up bearing blocks. The slide-ways 36, in being received between the flanges 38 of the bearing blocks, will permit the bearing blocks to be adjusted longitudinally of the frame A. To accomplish this longitudinal sliding adjustment of the take-up bearing blocks, a take-up screw 41 is provided for each bearing block. Each take-up screw has threaded thereon a capstan nut 42 and passes through an opening formed in a transversely extending bar 43 formed as a part of the arms 15. The outer end of each take-up screw 41 is seated in a socket 44 formed in its associated take-up bearing block 39, as best illustrated in Fig. 13. It will be appreciated that by manipulating the various take-up screws 41, the several take-up bearing blocks may be adjusted longitudinally outwardly of the opposite ends of the frame A. This adjustment of the bearing blocks for the shaft 21 will move this shaft to tighten a drive chain, not shown, which transmits power to the drive shaft. The adjustment of the bearing blocks for the shaft 30 results in movement of the wheel C outwardly to properly tension the traveling tread or track F.

In Figs. 8 and 9, the carrier rollers D and E are disclosed in detail. Each one of the take-up rollers D is formed with a hub 45 which is journaled on a stub shaft 46. This stub shaft is mounted in the bearing openings 18 of the frame A and is keyed against rotation relative to these bearing openings, as at 47. The bore of the hub 45 is suitably grooved at 48 to receive lubricant. A lubricant feeding duct 49 is formed in the stub shaft 46.

Radiating from the hub 45 are a pair of disc-like solid webs 50 which have enlarged rims 51 formed on their peripheries. Reinforcing ribs 52 are formed integrally with the hub 45, the web 50 and the rim 51, as best illustrated in the elevational view of Fig. 9. It will be seen that these axially spaced webs 50 with their rims 51 form a centrally grooved or channel form of roller. This central groove or channel functions in a manner to be described at a later point.

Each of the upper carrier rollers E is formed of very similar construction to the carrier rollers D. These upper carrier rollers are of slightly reduced dimensions to the rollers D, but they include a hub portion 53 which is journaled on a stub-shaft 54 mounted in the bearing openings of the ears 19. These upper carrier rollers E are lubricated in the same manner as the rollers D. Spaced, radial webs 55 are formed on the hub 53 and have enlarged rim portions 56 formed on their peripheries. These webs 55 and rims 56 are spaced axially to the same extent as the webs and rims 50 and 51, respectively, of the lower carrier rollers D. These upper carrier rollers, therefore, are of the same centrally grooved or channeled type.

In Figs. 1 and 2, the traveling tread or track is illustrated as being formed of an endless series of pivotally connected tread or traction shoes 57. All of these shoes are of identical construction and the detail features of the same are clearly illustrated in Figs. 10 to 12, inclusive.

Each one of these shoes 57 is integrally cast as a single piece which includes a traction or tread face 58. Certain of the edges, such as those designated by the reference character 59, are curved back from the tread or traction face in the manner best illustrated in Figs. 10 and 11. A suitable pattern of cored, reinforcing ribs 60 is provided on the back of the traction or tread face 58. Suitably spaced pivot ears 61 are provided on the opposite edges of the shoe and are formed with pitch holes 62 to receive the chain pins 63 by means of which the several shoes are pivotally connected.

Figs. 10 to 12, inclusive, clearly disclose the middle portion of the shoe as being cored hollow and provided with a back face or wall 64. Rising from this back wall 64 are the driving lugs 65. The several figures disclose these lugs as being of outward tapering formation with opposed converging side walls or faces. Each lug 65 is provided with opposed working faces 66 properly shaped to engage the working faces of the teeth 25 formed on the drive sprocket wheel B. It will be noted by inspecting Fig. 10 that drive lugs 65 are uniformly spaced laterally of opposite sides of the central plane of the shoe; i. e., the central plane which extends in the direction of travel of the shoe. The drive lugs 65 also are staggered or offset transversely with respect to each other so that one of the lugs is placed in advance of the other.

Figs. 10 and 12 clearly illustrate the space between the two drive lugs 65 as being built up at 67 for a distance equal to the overall length of both of the lugs 65. This built up portion 67 is curved at 68 and this curvature corresponds to the radius of each one of the wheels B and C.

It will be appreciated that the formation of the back wall or face 64 and the offset or staggered arrangement of the driving lugs 65 is such that no pockets are formed in which dirt can accumulate in a manner to prevent proper meshing of the lugs with the teeth of the drive sprocket wheel.

In Figs. 1, 5 and 6, the meshing of the drive sprocket teeth and the shoe lugs is clearly illustrated. The offset or staggered arrangement of the sprocket teeth on opposite sides of the central web 22 corresponds with the offset arrangement of the drive lugs 65 on the various tread shoes. These teeth and lugs, therefore, will properly mesh. Each shoe, also, is provided with lugs which mesh with the drive teeth of the sprocket B so that the tooth load is applied centrally to each shoe. The space between the drive lugs 65 on each shoe is designed to receive the rim portion 23 of the drive sprocket B and the rim portion 32 of the take-up wheel C. This meshing of the shoe lugs and wheel rims very effectively resists all lateral strains in both directions which are applied to the shoes and wheels as a result of steering of the machine or vehicle equipped with this type of traction device.

Fig. 8 clearly discloses the manner in which the spaced webs and rims of the carrier rollers D and E cooperate with the drive lugs 65 of the various tread shoes. The webs and rims of these carrier rollers straddle the shoe lugs due to the grooved or channeled formation of these rollers. This meshing of the carrier rollers and the shoe lugs also functions to resist all lateral strains placed upon the endless tread or track F in either lateral direction.

It is to be understood that the form of this invention herewith shown and described is to be taken as a preferred example of the same, and that various changes in the shape, size and arrangement of parts may be resorted to without departing from the spirit of the invention of the scope of the subjoined claims.

Having thus described the invention, I claim:

1. In a traction device of the type described, a drive sprocket wheel comprising a hub, an imperforate web carried by the hub, and a circular series of radially projecting ribs formed on each side face of the web with each rib terminating in a laterally hollowed out drive tooth at its outer end.

2. In a traction device of the type described, a drive sprocket wheel comprising a hub, an imperforate web carried by the hub, and a circular series of radially projecting ribs formed on each side face of the web with each rib terminating in a laterally hollowed out drive tooth at its outer end, the ribs and teeth on one side face of the web being located ahead of the ribs and teeth on the other side face.

3. A traction shoe comprising a tread surface, a back surface or wall, and a pair of laterally spaced driving lugs projecting from the back surface or wall and being elongated in the direction of travel of the shoe, said driving lugs being staggered in the direction of their elongation to a sufficient extent to avoid such relative overlapping as would form a pocket between the same in which foreign matter might accumulate.

4. A traction shoe comprising a tread surface, a substantially flat back surface or wall, and a pair of laterally spaced driving lugs projecting from said back surface or wall, said driving lugs being staggered in the direction of travel of the shoe sufficiently to avoid such relative overlapping as would form a pocket between the same, the staggering of the lugs and the flatness of the back surface or wall leaving the back of the shoe between the inner side face of each lug and the adjacent side margin of the shoe unobstructed.

5. In a traction device of the type described, an endless tread comprising a plurality of articulated shoes each of which is provided with a tread surface, a back surface or wall, and a pair of laterally spaced driving lugs projecting from the back surface or wall, said driving lugs being staggered in the direction of travel of the shoe to a sufficient extent to avoid such relative overlapping as would form a pocket between the same in which foreign matter might accumulate; and a driving sprocket wheel over which the endless tread is trained, said wheel comprising a hub, a web carried by the hub having a circumferentially continuous peripheral rim adapted to pass between the driving lugs of the shoes, and a series of driving teeth projecting laterally from each side of the web, the teeth on one side of the web being located circumferentially ahead of the teeth on the other side so that said teeth will mesh with the staggered lugs of the tread shoes.

6. In a traction device of the type described, an endless tread comprising a plurality of articulated shoes, each of which is provided with a tread surface, a substantially flat back surface or wall, and a pair of laterally spaced driving lugs projecting from said back surface or wall, said driving lugs being staggered in the direction of travel of the shoe sufficiently to avoid such relative overlapping as would form a pocket between the same, the staggering of the lugs and the flatness of the back surface or wall leaving the back of the shoe between the inner side face of each lug and the adjacent side margin of the shoe unobstructed; and a driving sprocket wheel over which the endless tread is trained, said wheel comprising a hub, a web carried by the hub having a circumferentially continuous peripheral rim adapted to pass between the driving lugs of the shoes, and a series of driving teeth projecting laterally from each side of the web, the teeth on one side of the web being located circumferentially ahead of the teeth on the other side so that said teeth will mesh with the staggered lugs of the tread shoes.

7. In a traction device of the type described, an endless tread comprising a plurality of articulated shoes, each of which is provided with a tread surface, a substantially flat back surface or wall, and a pair of laterally spaced driving lugs projecting from said back surface or wall, said driving lugs being staggered in the direction of travel of the shoe sufficiently to avoid such relative overlapping as would form a pocket between the same, the space between the driving lugs being built up above the flat back surface or wall and being shaped to correspond with the curvature of a sprocket wheel rim; and a drive sprocket wheel over which the endless tread is trained, said wheel comprising a hub, a web carried by the hub and having a laterally enlarged and circumferentially continuous peripheral rim adapted to pass between the driving lugs of the shoes while engaging said built up curved portions, and a series of driving teeth projecting laterally from each side of the web, the teeth on one side of the web being located circumferentially ahead of the teeth on the other side so that said teeth will mesh with the staggered lugs of the tread shoes.

HILMER N. EKBOM.